J. F. WARD & C. L. DAVIDSON.
AUTOMATIC PIPE COUPLING HEAD.
APPLICATION FILED APR. 27, 1908.
918,230.
Patented Apr. 13, 1909.
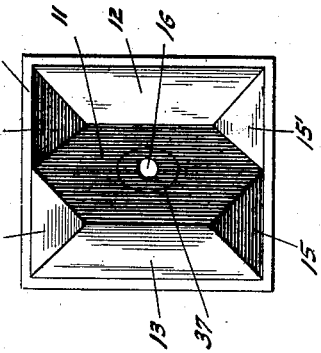
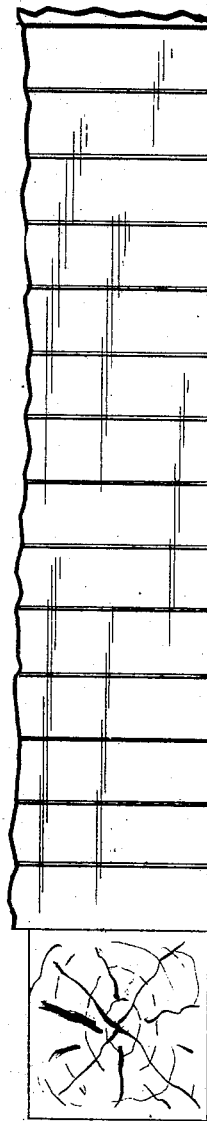
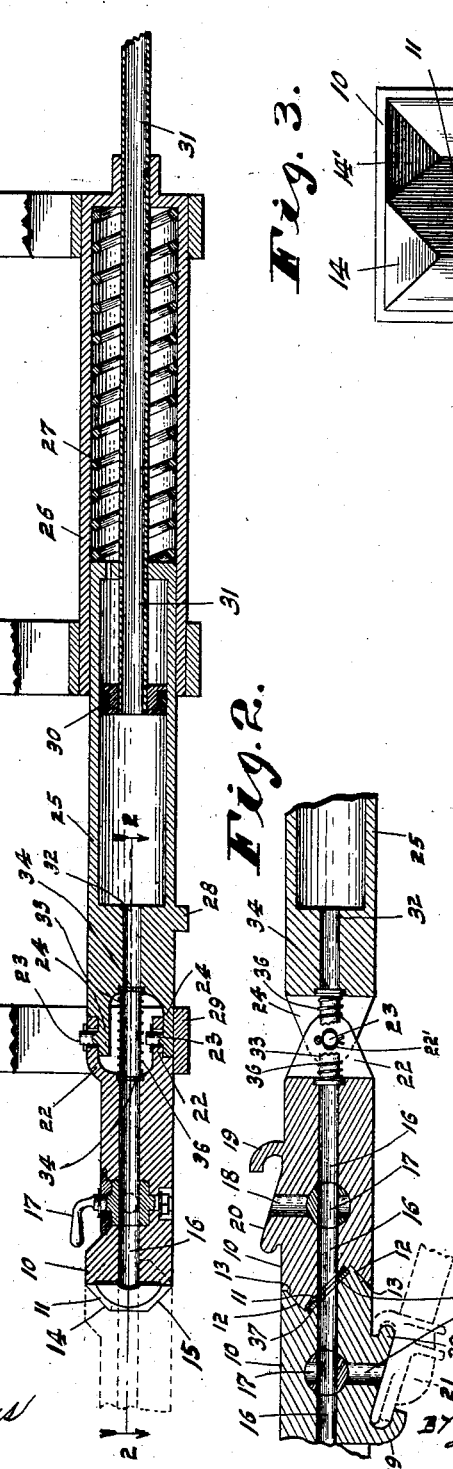
Witnesses
Frank A. Fahle
Thomas W. McMeans
Inventors
John F. Ward
Charles L. Davidson,
by Bradford Hood
Attorneys

UNITED STATES PATENT OFFICE.

JOHN F. WARD AND CHARLES L. DAVIDSON, OF INDIANAPOLIS, INDIANA, ASSIGNORS OF ONE-TENTH TO OSCAR E. HAISLUP AND ONE-TWENTIETH TO EDWARD P. VANCE, BOTH OF INDIANAPOLIS, INDIANA.

AUTOMATIC PIPE-COUPLING HEAD.

No. 918,230.  Specification of Letters Patent.  Patented April 13, 1909.

Application filed April 27, 1908. Serial No. 429,510.

*To all whom it may concern:*

Be it known that we, JOHN F. WARD and CHARLES L. DAVIDSON, citizens of the United States, residing at Indianapolis, in the county of Marion and State of Indiana, have invented certain new and useful Improvements in Automatic Pipe-Coupling Heads, of which the following is a specification.

The object of our invention is to produce a structure by means of which the air pipes or steam hose etc., of railway cars may be automatically coupled at the time of coupling the cars together into a train.

The accompanying drawings illustrate our invention, as applied to a single hose or pipe although it is to be understood that a multiplicity of passages may be provided without departing from the spirit of our invention.

Figure 1 is an axial section of a single pipe apparatus embodying our invention; Fig. 2 a section on line 2—2 of Fig. 1; and Fig. 3 an end elevation on a larger scale.

In the drawings, 10 indicates a head having a transversely inclined face 11 adapted to coact with the corresponding face 11 of a coacting head 10. Each face 11 is flanked at its inner end by an oppositely inclined face 12 and at its outer end by a face 13 which may conveniently be parallel with the face 12. The point formed by the faces 11 and 13 projects somewhat beyond the main body of the head 10 and the upper and lower corners are dubbed off at 14 and 15 in opposite directions as to engage and fit the corresponding surfaces 14' and 15' which incline inwardly and toward each other into the crotch between the surfaces 11 and 12, the arrangement being such that when the two heads 10 are brought together there may be a considerable variation from normal and proper positions without interfering with the proper automatic positioning of the two surfaces 11 against each other. Extending through each head 10 and opening into the face 11 is a passage 16. More than one passage may be provided if desired, the several passages being independent. Mounted within passage 16 is a three-way cock 17 by means of which connection may be made between the inner passage 16 and the transverse passage 18 which opens through the side of head 10 adjacent the pair of hooks 19 and 20, so formed as to receive an ordinary coupling head 21, shown in dotted lines in Fig. 2, the arrangement being such that a car equipped with our structure may be coupled into a train having ordinary flexible hose couplings.

The inner end of each head 10 is provided with a pair of substantially parallel arms 22, 22 which are pivotally connected, upon vertical pins 23, 23 with a pair of substantially horizontal arms 24, 24 carried by a plunger 25 which is fitted within a fixed carrier or chamber 26. Mounted within carrier 26 is a spring 27 which normally urges plunger 25 outwardly, the amount of outward movement being limited by the shoulder 28 adapted to engage a hanger 29 which supports the arms 24 of the plunger 25. The plunger 25 is hollow and fitted therein is a stationary piston 30 carried by a pipe 31 the arrangement being such that plunger 25 is free to be shifted axially while at the same time permitting fluid pressure to pass from tube 31 into the interior of plunger 25 and thence through the passage 32 and a hose 33 into passage 16. The hose 33 is provided at opposite ends with flanges 34 adapted to fit into corresponding recesses formed in the head 10 and plunger 25, and the hose is surrounded by a coil spring 36 which serves not only to hold the heads 34 in place in their sockets but also to somewhat stiffen the flexible hose and hold it substantially straight at the same time not interfering with the swing of head 10 around the pivots 23. Faces 11 may be provided, immediately surrounding passages 16, with packing members 37 if desired.

In operation spring 27 tends to normally drive plunger 25 outward until shoulder 28 engages hanger 29. When the two cars are brought together the two heads 10 fit into each other, the slanting surfaces 11, 12, 13, 14, 15, 14' and 15' mating with each other and producing a proper alinement of the two heads, whereupon, as the cars are brought together for their traction coupling, the spring 27 will be compressed to about the position shown in Fig. 1. As the cars pass around curves sufficient flexibility is had around the pivot pins 23.

It might sometimes happen, that by reason of a broken fixture upon a coöperating car or otherwise, a proper meeting of the members might not be obtained and, in order to prevent injury we therefore make the plunger 25 of such length that it will permit head 10 to be shoved entirely back under the dead head of the car, as is clearly apparent in Fig. 1. It is also desirable to provide means whereby the slight vertical inequalities which may occur between trucks of adjacent cars at any time will be compensated and for this purpose we longitudinally elongate the holes 22' of arms 22 which are arranged to receive the pins 23 of arms 24 thus permitting a slight vertical adjustment or swing of the outer end of the head 10 relative to the arms 24.

We claim as our invention:—

1. An automatic hose coupling comprising a main holder arranged substantially longitudinally of the car, a plunger mounted in said holder and longitudinally movable therein, a spring normally urging said plunger outwardly, a tubular piston fitted within said plunger, a tubular head pivotally mounted on the plunger upon a substantially vertical axis, said tubular head having its outer end formed to fit within and mate with a correspondingly formed head.

2. An automatic hose coupling comprising a main holder arranged substantially longitudinally of the car, a plunger mounted in said holder and longitudinally movable therein, a spring normally urging said plunger outwardly, a tubular head pivotally mounted on the plunger upon a substantially vertical axis, said tubular head having its outer end formed to fit within and mate with a correspondingly formed head, a flexible tubular connection connecting the interiors of the tubular head and the plunger and extending across the vertical axis of the tubular head, said flexible tube having a flanged head at each end and an intermediate spring.

3. An automatic hose coupling comprising a main holder arranged substantially longitudinally of the car, a plunger mounted in said holder and longitudinally movable therein, a spring normally urging said plunger outwardly, a tubular piston fitted within said plunger, a tubular head pivotally mounted on the plunger upon a substantially vertical axis, said tubular head having its outer end formed to fit within and mate with a correspondingly formed head, a flexible tubular connection connecting the interiors of the tubular head and the plunger and extending across the vertical axis of the tubular head, said flexible tube having a flanged head at each end and an intermediate spring.

4. An automatic hose coupling comprising a main holder arranged substantially longitudinally of the car, a plunger mounted in said holder and longitudinally movable therein, a spring normally urging said plunger outwardly, a tubular head pivotally mounted on the plunger upon a substantially vertical axis, said tubular head having its outer end formed to fit within and mate with a correspondingly formed head, a flexible tubular connection connecting the interiors of the tubular head and the plunger and extending across the vertical axis of the tubular head.

5. An automatic hose coupling comprising a main holder arranged substantially longitudinally of the car, a plunger mounted in said holder and longitudinally movable therein, a spring normally urging said plunger outwardly, a tubular piston fitted within said plunger, a tubular head pivotally mounted on the plunger upon a substantially vertical axis, said tubular head having its outer end formed to fit within and mate with a correspondingly formed head, a flexible tubular connection connecting the interiors of the tubular head and the plunger and extending across the vertical axis of the tubular head.

6. An automatic hose coupling comprising a main holder arranged substantially longitudinally of the car, a plunger mounted in said holder and longitudinally movable therein, a spring normally urging said plunger outwardly, a tubular piston fitted within said plunger, a tubular head pivotally mounted on the plunger upon a substantially vertical axis, said tubular head having its outer end formed to fit within and mate with a correspondingly formed head, means arranged upon the tubular head for receiving a standard hose coupling, and a cock arranged in the tubular head and adapted to establish or disestablish communication with said last mentioned means.

7. An automatic hose coupling comprising a main holder arranged substantially longitudinally of the car, a plunger mounted in said holder and longitudinally movable therein, a spring normally urging said plunger outwardly, a tubular head pivotally mounted on the plunger upon a substantially vertical axis, said tubular head having its outer end formed to fit within and mate with a correspondingly formed head, a flexible tubular connection connecting the interiors of the tubular head and the plunger and extending across the vertical axis of the tubular head, said flexible tube having a flanged head at each end and an intermediate spring, means arranged upon the tubular head for receiving a standard hose coupling, and a cock arranged in the tubular head and adapted to establish or disestablish communication with said last mentioned means.

8. An automatic hose coupling comprising a main holder arranged substantially longitudinally of the car, a plunger mounted in said holder and longitudinally movable therein, a spring normally urging said plunger outwardly, a tubular piston fitted within said plunger, a tubular head pivotally mounted on the plunger upon a substantially vertical axis, said tubular head having its outer end formed to fit within and mate with a correspondingly formed head, a flexible tubular connection connecting the interiors of the tubular head and the plunger and extending across the vertical axis of the tubular head, said flexible tube having a flanged head at each end and an intermediate spring means arranged upon the tubular head for receiving a standard hose coupling, and a cock arranged in the tubular head and adapted to establish or disestablish communication with said last mentioned means.

9. An automatic hose coupling comprising a main holder arranged substantially longitudinally of the car, a plunger mounted in said holder and longitudinally movable therein, a spring normally urging said plunger outwardly, a tubular head pivotally mounted on the plunger upon a substantially vertical axis, said tubular head having its outer end formed to fit within and mate with a correspondingly formed head, a flexible tubular connection connecting the interiors of the tubular head and the plunger and extending across the vertical axis of the tubular head, means arranged upon the tubular head for receiving a standard hose coupling, and a cock arranged in the tubular head and adapted to establish or disestablish communication with said last mentioned means.

10. An automatic hose coupling comprising a main holder arranged substantially longitudinally of the car, a plunger mounted in said holder and longitudinally movable therein, a spring normally urging said plunger outwardly, a tubular piston fitted within said plunger, a tubular head pivotally mounted on the plunger upon a substantially vertical axis, said tubular head having its outer end formed to fit within and mate with a correspondingly formed head, a flexible tubular connection connecting the interiors of the tubular head and the plunger and extending across the vertical axis of the tubular head, means arranged upon the tubular head for receiving a standard hose coupling, and a cock arranged in the tubular head and adapted to establish or disestablish communication with said last mentioned means.

11. An automatic hose coupling comprising a main hollow body, having a hose receptacle at the forward end of its interior, a tubular coupling head pivotally mounted on said body on a substantially vertical axis with the rear end of its interior upon the opposite side of the axis relative to the forward end of the interior of the main body, a flexible tubing forming a connection between the tubular head and the interior of the main body across the vertical pivot thereof, and a helical compression spring surrounding said tube and serving to hold the same in place.

In witness whereof, we have hereunto set our hands and seals at Indianapolis, Indiana, this twenty-fifth day of April, A. D. one thousand nine hundred and eight.

JOHN F. WARD. [L. S.]
CHARLES L. DAVIDSON. [L. S.]

Witnesses:
ARTHUR M. HOOD,
THOMAS W. MCMEANS.